Sept. 8, 1959  F. E. FOWLER ET AL  2,902,948
CRACKER-SANDWICH MAKING MACHINE
Original Filed Oct. 10, 1949  6 Sheets-Sheet 4
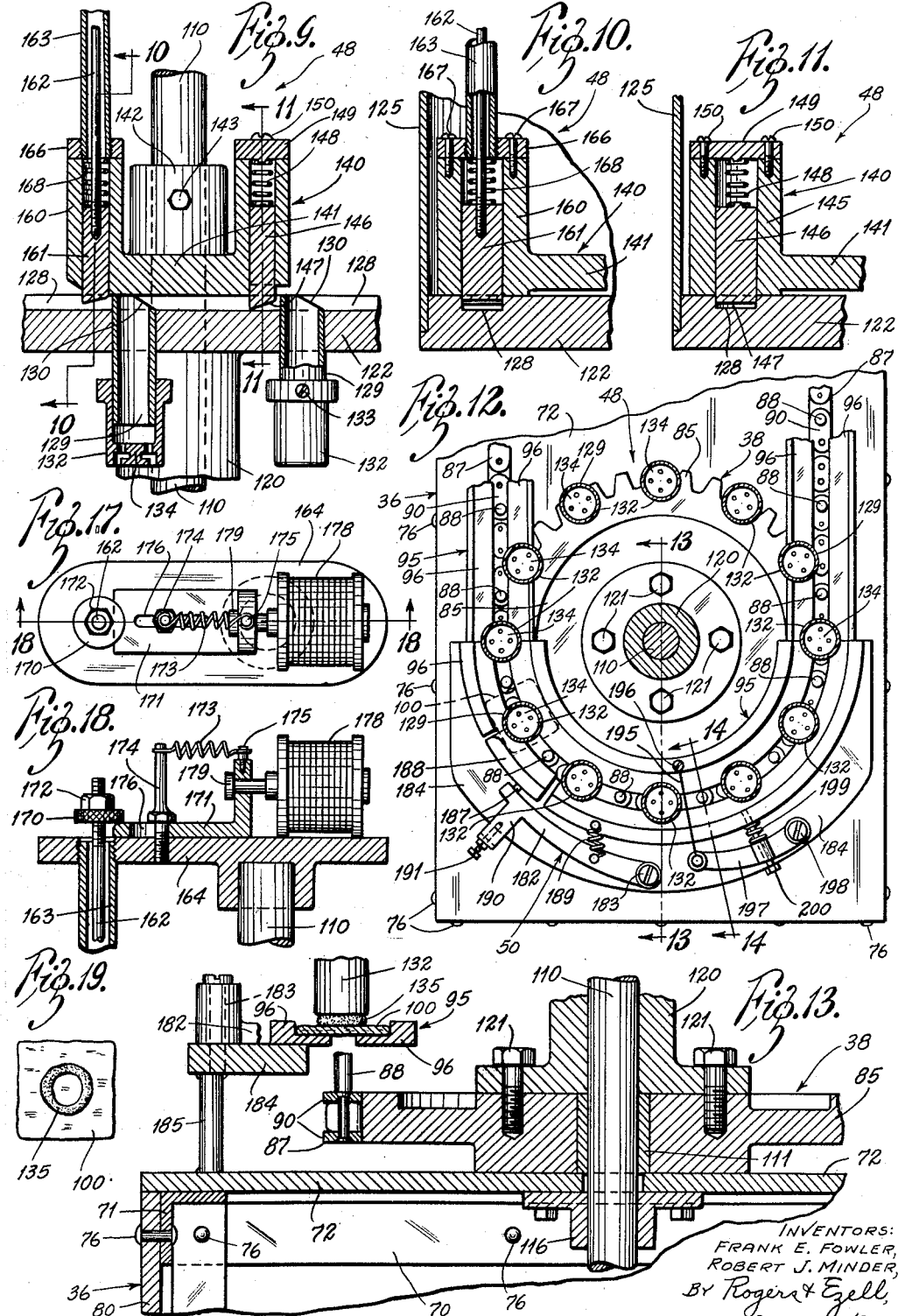
INVENTORS:
FRANK E. FOWLER,
ROBERT J. MINDER,
BY Rogers & Ezell,
ATTORNEYS.

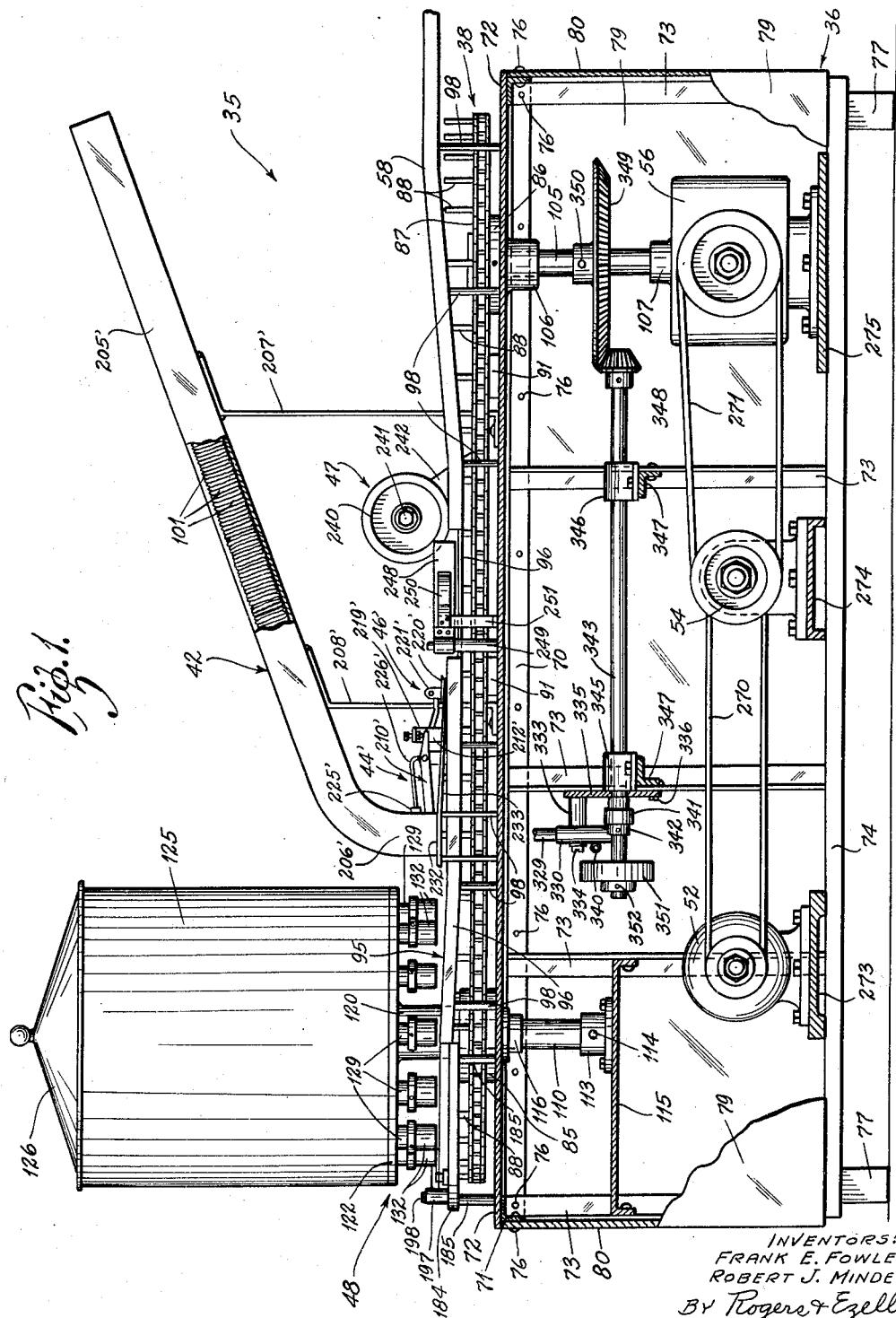

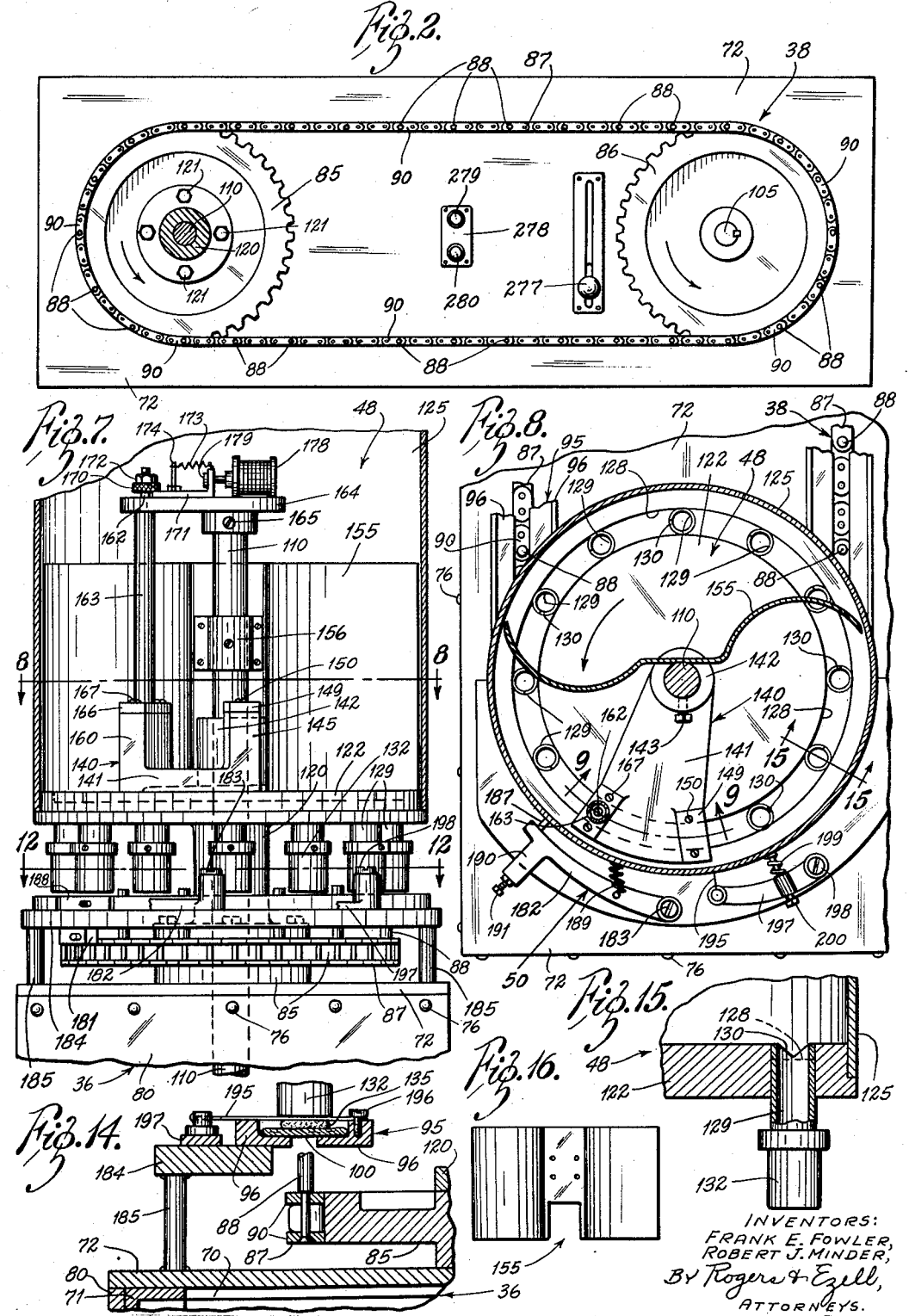

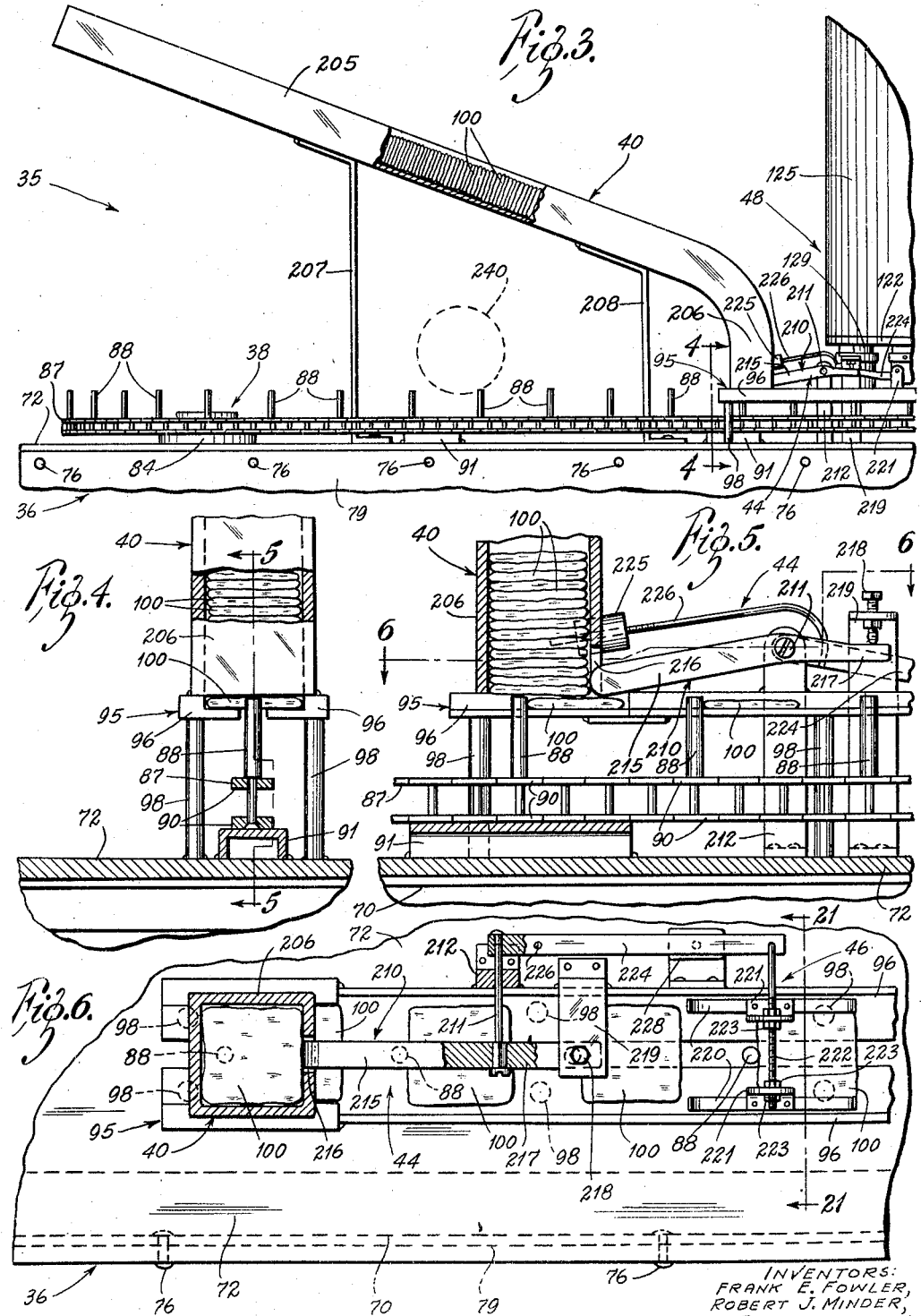

Sept. 8, 1959 F. E. FOWLER ET AL 2,902,948
CRACKER-SANDWICH MAKING MACHINE
Original Filed Oct. 10, 1949 6 Sheets-Sheet 5
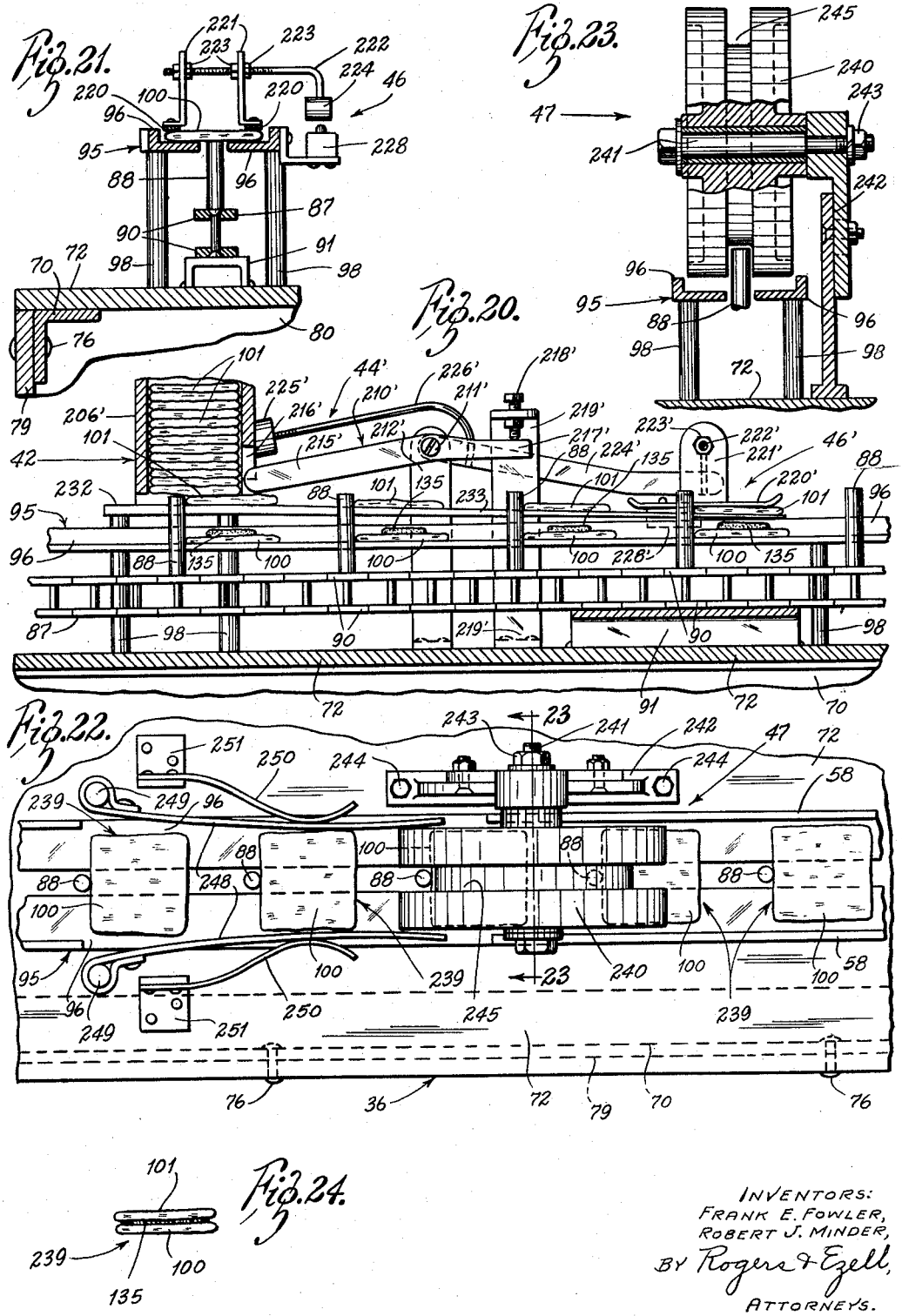
INVENTORS:
FRANK E. FOWLER,
ROBERT J. MINDER,
BY Rogers & Ezell,
ATTORNEYS.

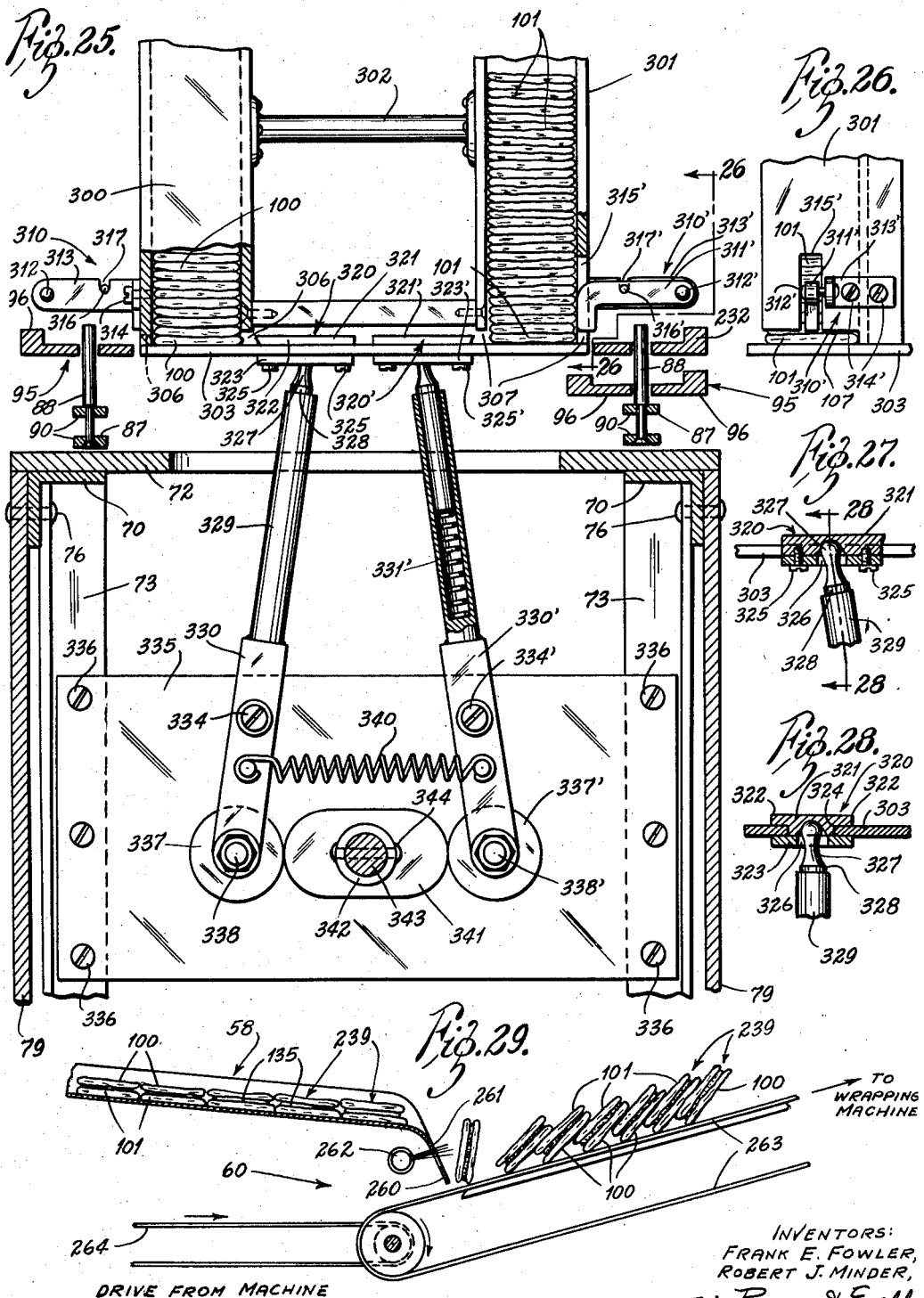

United States Patent Office 2,902,948
Patented Sept. 8, 1959

2,902,948

CRACKER-SANDWICH MAKING MACHINE

Frank Edward Fowler and Robert J. Minder, Athens, Ga.

Original application October 10, 1949, Serial No. 120,552. Divided and this application September 12, 1957, Serial No. 683,921

4 Claims. (Cl. 107—1)

The present invention relates generally to automatic machinery for making sandwiches, and more particularly to automatic machinery for making cracker or like sandwiches which include peanut butter, confectionery filling, and other substances. The present application is a division of our copending application Serial No. 120,552, filed October 10, 1949 for Cracker-Sandwich Making Machine, and now abandoned.

In brief, the present invention includes mechanism for receiving, mixing and dispensing filling material, separate hoppers for receiving the upper and lower crackers or the like, a continuous pusher mechanism for moving the lower cracker from a pick-up position past a position in which the top cracker is received, and on to a sandwich discharge position, a device for pressing the assembled crackers with filling to a desired thickness, devices for stopping the machine or for giving a suitable warning upon failure of the continuous pusher mechanism to pick up either a bottom or a top cracker or the like, and interrelating elements and power connections. The several elements are mounted upon a rectangular frame and the movable elements are driven by a single motor. The present machine may be operated to make four hundred to six hundred unit peanut butter cracker sandwiches or the like per minute.

Therefore, an object of the present invention is to provide a novel automatic sandwich making machine which is adapted to make cracker sandwiches or the like at a high rate of speed and with uniformity of product.

Another object is to provide a novel sandwich making machine which is fully automatic in the formation of the sandwiches, thereby reducing to a minimum the hand handling of the food materials employed.

Another object is to provide a novel automatic sandwich making machine which is continuous in its sandwich making operation as long as crackers or the like and filler material are supplied to it, but which automatically stops upon failure of crackers or the like.

Another object is to provide a novel automatic sandwich making machine which incorporates novel cracker or the like pick-up and release mechanism and novel filler material depositing mechanism.

The foregoing and other objects and advantages are apparent from the following description taken with the accompanying drawings, in which:

Figure 1 is a side elevational view of an automatic sandwich making machine constructed in accordance with the teachings of the present invention, the rear side panel being broken away for purposes of illustrating the power mechanism;

Figure 2 is a plan view on a reduced scale, showing only the endless pusher mechanism and its relationship to the top of the cabinet;

Figure 3 is a fragmentary side elevational view looking at the other side of the machine from that shown in Figure 1, illustrating structural details;

Figure 4 is an enlarged fragmentary vertical transverse cross-sectional view on substantially the line 4—4 of Figure 3;

Figure 5 is a fragmentary vertical longitudinal cross-sectional view on substatnially the line 5—5 of Figure 4;

Figure 6 is a fragmentary horizontal cross-sectional view on substantially the line 6—6 of Fig. 5;

Figure 7 is a vertical transverse cross-sectional view through the filler material receiving, mixing and dispensing mechanism, parts being shown in elevation;

Figure 8 is a horizontal cross-sectional view on substantially the line 8—8 of Figure 7;

Figure 9 is a further enlarged vertical arcuate cross-sectional view on substantially the line 9—9 of Figure 8;

Figure 10 is a vertical cross-sectional view on substantially the line 10—10 of Figure 9;

Figure 11 is a vertical cross-sectional view on substantially the line 11—11 of Figure 9;

Figure 12 is a horizontal cross-sectional view on substantially the line 12—12 of Figure 7;

Figure 13 is a further enlarged vertical cross-sectional view on substantially the line 13—13 of Figure 12;

Figure 14 is a further enlarged vertical cross-sectional view on substantially the line 14—14 of Figure 12;

Figure 15 is a further enlarged vertical cross-sectional view on substantially the line 15—15 of Figure 8;

Figure 16 is a reduced elevational view of the filler material scraper;

Figure 17 is an enlarged plan view of the operative portion of the mechanism for preventing filler material feed when no cracker is disposed beneath the operative discharge tube;

Figure 18 is a vertical cross-sectional view on substantially the line 18—18 of Figure 17;

Figure 19 is a plan view of a square cracker with a deposit of filler material thereon;

Figure 20 is a view similar to Figure 5, but showing the top cracker pick-up and deposit and disclosing the actuator for stopping the mechanism upon failure of a top cracker;

Figure 21 is a vertical cross-sectional view on substantially the line 21—21 of Figure 6;

Figure 22 is an enlarged fragmentary plan view illustrating details of the sandwich presser roller and cracker sandwich centering mechanism;

Figure 23 is a vertical cross-sectional view on substantially the line 23—23 of Figure 22;

Figure 24 is a side elevational view of a cracker sandwich formed by the present machine;

Figure 25 is a vertical transverse cross-sectional view through a modified mechanism for feeding crackers onto the continuous pusher;

Figure 26 is a cross-sectional view on substantially the line 26—26 of Figure 25;

Figure 27 is a vertical cross-sectional view through one of the cracker rams and the upper end of the actuating shaft;

Figure 28 is a cross-sectional view on substantially the line 28—28 of Figure 27; and Figure 29 is a diagrammatic view of mechanism for stacking the completed cracker sandwich for packaging upon discharge from the present machine.

Referring to the drawings more particularly by reference numerals, 35 indicates generally a sandwich making machine constructed in accordance with the teachings of the present invention.

Broadly, the machine 35 includes a rectangular supporting frame and cabinet 36 (Figure 1), an endless pusher mechanism 38 (Figures 2, 3), a bottom cracker receiver chute 40 (Figures 3, 25), a top cracker receiver chute 42 (Figures 1, 25), cracker release units 44 and 44' for the chutes 40 and 42 (Figures 5, 20), respectively, "no cracker" devices 46 and 46' adjacent the chutes 40 and 42 (Figures 6, 21), respectively, a sandwich presser device 47 (Figures 1, 23), a filler material receiving, mixing and discharging mechanism 48 (Figures 1, 7–18), a "no cracker" device 50 for preventing discharge of filler material by said mechanism 48 upon failure of a cracker on the endless pusher to receive the material (Figure 12), a motor 52 which furnishes the power for operation of the machine 35 (Figure 1), a speed-change unit 54 (Figure 1), a gear reduction unit 56 (Figure 1), a discharge trough 58 for completed sandwiches (Figures 1, 29), cracker sandwich stacking mechanism 60 (Figure 19), and interrelating elements both mechanical and electrical for correlating the actions of the several units and mechanisms.

More particularly considering the several mechanisms, devices, and elements which comprise the machine 35, the supporting frame and cabinet 36 is of rectangular form and includes a pair of upper longitudinal frame members 70 of angle cross section and a pair of upper end frame members 71, also of angle cross section, which horizontally support a heavy top plate 72 and which are, in turn, supported by a plurality of vertical frame members 73 of angle cross section (Figure 1). Lower longitudinal frame members 74 and end frame members 75 (not shown), both of angular cross section, support the vertical frame members 73 to form a sturdy frame. Suitable bolts or rivets 76 in selected numbers maintain the several frame members together. Supporting feet 77 maintain the frame and cabinet 36 spaced from a supporting surface. Removable side panels 79 and end panels 80 are secured to the several frame members and enclose the motor 52 and other moving units and parts.

The endless pusher mechanism 38 and its relationship to the plate 72 is best shown in Figure 2. The endless pusher mechanism 38 includes two spaced sprockets 85 and 86 which are of substantial size and which receive a large endless chain 87 to which are secured spaced vertically extending posts 88 (Figures 4, 5 and 21). The spacing relationship of the posts 88 is correlated with the spacing of the discharge tubes of the mechanism 48, as is more particularly pointed out below. As is clear from Figures 4 and 21, the posts 88 may be formed to serve the double capacity of securing selected link elements 90 of the endless chain 87 together at one end, it being understood that suitable rivets or the like secure the other ends of the link elements 90 together in the formation of the chain 87. The posts 88 may be welded to the link elements 90. The endless chain 87 does not drag upon the upper surface of the plate 72, but moves upon spaced supporting bridges 91 which are welded or otherwise secured to the plate 72 at suitably spaced positions. Associated with the chain 87 and spaced vertically therefrom is a split trough 95 which includes opposed identical members 96 which are spaced apart to receive between them the upper ends of the posts 88, as is clear from Figures 4 and 21. The trough members 96 are supported in the main upon suitable spaced columns 98 which are mounted on the plate 72 in spaced opposed relation to each other, as is clear from the drawings. The elevation of the trough 96 from the plate 72 and from the chain 87 varies around its course for purposes of first handling a bottom cracker 100 or the like, and then subsequently handling the filling material, the top cracker 101 or the like, and ultimately discharging the assembled sandwich from the machine 35, as is more particularly pointed out below.

As is clear from Figures 1 and 2, the sprocket 86 is keyed to the upper end of a shaft 105 and is maintained against removal by a suitable setscrew. The shaft 105 has bearing support against lateral movement in its upper end in a bearing 106 which is welded or otherwise secured to the bottom of the plate 72, and at its lower end in a sleeve 107 formed integral with or secured to the top of the casing housing the gears of the gear reduction unit 56. It is to be understood that a bevelled gear or the like is secured to the lower end of a shaft 105 which extends into the gear reduction unit 56 and that such bevelled gear is in engagement with the gears of the gear reduction unit 56 which is well known in the art and is not particularly disclosed.

The sprocket 85 is driven by the chain 87 from the sprocket 86, and is freely rotatable on a stationary vertical shaft 110, the sprocket 85 including a suitable bushing 111 for engagement of the shaft 110 (Figure 13). As is clear from Figure 13, the hub of the sprocket 85 rests on the plate 72, it being understood that ball bearings or the like may be provided if desired. The shaft 110 extends downwardly through the plate 72 and is supported at its lower end in a thrust bearing 113, being secured thereto by suitable setscrews 114. The bearing 113 is secured to a transverse reinforcing member 115 secured to suitable vertical frame members 73. A sleeve 116 welded or otherwise secured to the lower surface of the plate 72 maintains the shaft 110 against lateral movement.

The filler material containing, mixing and discharging mechanism 48 is mounted on and secured to the sprocket 85 for rotation about the shaft 110 (Figures 1, 7, 8, 9, 12, and 13). A heavy sleeve 120 surrounds the shaft 110 and is secured to the upper surface of the sprocket 85 by means of an integral flange and securing bolts 121 (Figure 13). A centrally apertured plate 122 of annular form is formed integral with or is welded or otherwise secured to the sleeve 120, the shaft 110 extending centrally therethrough (Figure 9). A cylindrical casing 125 is mounted on the plate 122 as is shown in Figure 7 and is closed at the top by a removable conical lid 126. As is clear from Figures 7, 10 and 11, the cylindrical casing 125 rests on an annular shoulder formed in the periphery of the plate 122. An annular groove 128 is formed in the plate 122 in the upper surface thereof (Figures 8, 9 and 15). A plurality of downwardly extending sleeves 129 is mounted in the groove 128, each sleeve 129 being flush with the plate 122 for a portion of its upper end and including a portion angularly directed toward the bottom of the groove 128 as is clear from Figures 9 and 15, forming in effect a mouth 130 to receive filler material when the upper ends of the tubes 129 are considered in relation to a cover over the groove 128. To the lower end of each tube 129 is removably secured a nozzle 132 by a suitable setscrew 133 (Figure 9). The disclosed nozzles 132 are formed with an internally located annular obstruction 134 to extrude or discharge a doughnut-shaped charge of filler material 135, as is shown in Figure 19. Manifestly, the shape of the charge 135 may be varied as desired, the nozzle 132 being replaced by another nozzle when another charge shape is required. In the instant disclosure, twelve nozzles 132 are employed, the spacing of which is correlated with the posts 88 as is stated above. A larger or smaller number of nozzles 132 may be employed, depending upon the particular requirements of the filler material being discharged, and upon other factors concerning sandwiches to be formed by the present machine 35.

A filler discharge device 140 is provided which comprises a horizontally disposed plate 141 and a sleeve 142 formed integral therewith which is secured to the shaft 110 by a suitable setscrew 143 (Figures 8–11). The plate 141 is of wedge shape, as is clear from Figure 8 and extends out over the groove 128 to close a segment at a time. A vertically extending sleeve 145 is formed integral with or is secured to the plate 141 in a position above the groove 128. The sleeve 145 has a generally rectangularly shaped internal passage which receives a rectangularly shaped filler material extruder plunger 146 which has a bevelled lower end 147 disposed within the groove 128 and filling the same, as is clear from Figures 9 and 11. A compression spring 148 biases the plunger 146 into engagement with the groove 128, the upper end of the spring 148 engaging a closure plate 149 secured to the upper end of the sleeve 145 by suitable screws 150. The plunger 146 is to one side of the outer end of the plate 141 so that, when the plunger 146 has passed a tube 129, the segment of groove 128 between it and the next tube 129 is fully covered by the plate 141, as is clear from Figure 9. Manifestly, filler material in the groove 128 ahead of the plunger 146 and up to the next tube 129 will be forced into the opening 130 of the tube 129 as the plate 122 is rotated.

There is provided a filler material 135, mixing and groove 128 filling scraper 155 which is secured to the shaft 110 by means of a bracket 156 and screws. As is clear from the drawings, the scraper 155 extends across the plate 122 and is of irregular cross section in order to achieve maximum effect. The scraper 155 mixes and scrapes the filler material 135 excess from the groove 128 as the plate 122 revolves.

The "no cracker" device 50 is provided for preventing discharge of filler material 135 when the continuous pusher mechanism 38 fails to provide a cracker 100 beneath the to be discharged tube 129, and is particularly advantageous in starting the machine to permit crackers to move to filling positions. A second sleeve 160 identical with the sleeve 145 is formed integral with or is secured to the plate 141 in spaced relation to the sleeve 145 and above the groove 128, the center line to center line arcuate distance between sleeves 145 and 160 being the arcuate center line to center line distance between adjacent tubes 129. A rectangularly shaped plunger 161 is disposed in the rectangularly cross section bore of the sleeve 160 similar to the plunger 146.

The plunger 161 not only acts to scavenge the groove 128 in case there is no cracker in position, it also acts to scrape any predetermined amount of filling material out of the groove 128 ahead of plunger 146. By lowering the plunger 161 deeper into the groove 128, less material will be left in the groove 128 to be scraped out by the plunger 146. This adjustment is made by screwing up or down on nut 170. This adjustment can be made while the machine is in operation and will regulate the amount of filling material deposited on crackers.

The "no cracker" device 50 is used primarily to rotate or operate machine before crackers reach location under nozzles, as in starting the machine, or a double check on the "no cracker" device 46 in case of a failure at that point to stop the machine.

The plunger 161 is adapted to be moved to the bottom of the groove 128 to fully discharge material therefrom when necessary as is described below, but normally rides in a predetermined position above the bottom of the groove 128 as is clear from Figures 9 and 10. A rod 162 threadedly engages the upper end of the plunger 161 and extends upwardly through a protective tube 163. The upper end of the tube 163 threadedly engages an opening in a plate 164, which is secured to the upper end of the shaft 110 by a suitable setscrew 165 extending through an integral hub thereof (Figures 7, 9, 10, 17 and 18). The lower end of the tube 163 threadedly engages a threaded opening in a plate 166 which is secured to the upper end of the sleeve 160 by suitable screws 167. A compression spring 168 bearing against the top of the plunger 161 and against the lower end of tube 163 biases the plunger 161 downwardly into groove 128 engaging position. The plunger 161 is normally maintained in its raised position by an adjustable nut 170 engaging one end of a bracket 171, and is secured against loosening by a lock nut 172. Manifestly, the lower end of the plunger 161 may be adjusted by the nuts 170 and 171 to dispose it at any selected point above the bottom of the groove 128, so that any predetermined amount of filler material 135 may be discharged through the nozzles 132, all material 135 above the plane of movement of the lower end of the plunger 161 being removed from the groove 128 by the plunger 161 before the plate 141 covers the concerned groove segment. The bracket 171 is slidably disposed on the plate 164 as shown in Figures 17 and 18 and is biased into the position as shown in these figures by a tension spring 173, one end of which is secured to the upper end of a post 174 and the other end of which is secured to a screw 175 or the like secured in the vertical wall of the bracket 171. The post 174 extends through a slot 176 in the bracket 171 to permit movement of the latter, the post 174 being threadedly anchored in the plate 164. A solenoid 178 is secured on the plate 164 and includes a plunger 179 which is connected to the vertical wall of the bracket 171 as shown. Energization of the coil of the solenoid 178 effects movement of the bracket 171 to the right, considering Figure 18, and thus removes the bracket 171 from beneath the nut 170, thereby permitting the spring 168 to move the plunger 161 into the groove 128. For energizing the coil of the solenoid 178, there is provided a micro-switch 181 which is conveniently mounted beneath and is connected to an arcuate plate 184 (Figure 7), the micro-switch 181 including the usual actuator button which is engageable by a pivotally mounted lever 182 mounted on a pivot screw 183 secured to the upper surface of the arcuate plate 184 mounted on posts 185 welded or otherwise secured to the plate 72 (Figure 13). It is to be noted that the arcuate plate 184 supports the outer member 96 of the trough 95 at the left end of the machine 35 when considering Figure 1. At its free end, the lever 182 includes a boss 187 which is biased against a pivotally mounted arcuate member 188 by a tension spring 189, the arcuate member 188 forming a segment of the outer member 96 of the trough 95 and being movable inwardly a predetermined amount upon failure of a cracker 100 in the trough 95 between any two of the posts 88. The lever 182 includes an extension 190 which extends outwardly and downwardly and supports an adjustable screw 191 disposed beneath the arcuate plate 184 in a position to contact the button of the micro-switch 181 as aforesaid when the lever 182 is pivoted inwardly under the influence of the spring 189 upon failure of a cracker in the trough 95. Actuation of the micro-switch 181 effects energization of the coil of the solenoid 178 to withdraw the bracket 171 from beneath the nut 170, thereby throwing the plunger 161 and clearing the channel 128 of filler material.

There is provided a filler material cut-off wire 195 which is stretched across the trough 95 in a manner to just clear the bottoms of the nozzles 132 (Figures 12 and 14). One end of the wire 195 is secured to a screw 196 which threadedly engages the inner member 96 of the trough 95, the other end being secured to the free end of a lever 197 pivotally mounted on a post 198 supported by the arcuate plate 184. A compression spring 199 mounted on a bolt 200 biases the lever 197 outwardly to maintain the cutting wire 195 taut.

One preferred configuration of the bottom cracker receiver chute 40 as shown in Figures 3, 4 and 5 and comprises a three-sided trough 205 including a closed vertically extending lower end 206. Suitable braces 207 and 208 mounted on the plate 72 support the trough 205. The lower end of the vertical portion 206 rests on the members 96 of the trough 95, being welded or otherwise secured thereto as is shown in Figure 4. The bottom cracker rests on the bottom of the trough 95, and, as is clear from Figure 5, the bottom crackers 100 are adapted to be moved successively from the stack by posts 88. The trough 205 is shaped as shown to provide an angularly disposed portion in order to relieve the bottommost cracker 100 of the substantial portion of the total weight of the crackers.

The cracker release unit 44 for the chute 40 comprises a bell crank lever 210 pivotally mounted on a shaft 211 which is mounted transversely in the upper end of a bracket 212 supported on and secured to the plate 72 by suitable screws or the like. The free end of one arm 215 of the bell crank lever 210 extends into an opening 216 in a wall of the vertical portion 206 of the trough 205 in a position to engage crackers 100 in the portion 206, as is clear from Figures 5 and 6. The other arm 217 of the bell crank 210 extends beneath an adjustable screw 218 threaded through a horizontal portion of a bracket 219 supported by and secured to the plate 72 by suitable screws. Normally, the bell crank lever 210 is positioned so that the free end of the arm 215 is disposed at a level above the bottom of the trough 95 so as to permit a single cracker 100 to be moved from the bottom of the stack, but other crackers are retained in position. The screw 218 permits adjustment of the bell crank lever 210 as required.

As stated, "no cracker" devices 46 and 46' are associated with the chutes 40 and 42. The device 46 adjacent the chute 40 includes a pair of spaced runners 220. Each runner 220 is mounted on the foot of a bracket 221 which are secured on a transversely disposed shaft 222, the shaft 222 being threaded and receiving suitable nuts 223 which secure the brackets 221 in adjusted positions. One end of the shaft 222 engages the free end of a lever 224 which is pivotally mounted on the shaft 211 exteriorly of the bracket 212 (Figures 5 and 6). A counter balance weight 225 is provided for the device 46 which threadedly engages the free end of a rod 226 which is anchored in the lever 224 near the pivotal mount thereof, as is clear from Figure 5. Beneath the lever 224 is a micro-switch 228 or the like having the usual actuator button which is adapted to be engaged by the lever 224 upon failure of a cracker 100 between any pair of posts 88. The micro-switch 228 is connected by suitable leads in series with the power circuit of the motor 52 and with standard motor brakes, and is adapted to deenergize and apply brakes to the motor 52 upon engagement of its actuator button by the lever 224. Standard brakes are desirable to prevent overrun of the machine 35. If desired, the micro-switch 228 may also be connected into a circuit for energizing a warning signal so that an operator will know that the machine 35 has stopped. Optionally, the micro-switch 228 may be connected only in a circuit for energizing a warning signal so that an operator may remove the upper cracker which will ultimately be deposited in the empty space, but the machine 35 will continue to operate. No electrical circuit is shown for the micro-switch 228, since it is obvious from the foregoing description and anyone would be able to connect the micro-switch 228 and the motor 52 or the micro-switch 228 and a warning device from the instant disclosure. It is contemplated that the weight 225 will be adjusted to a fine point in respect to the runners 220 and the brackets 221 so that a minimum of weight rests upon the crackers 100, thereby minimizing any damage to the crackers 100.

The top cracker receiver chute 42 is like the chute 40, and, hence, the same reference numerals primed have been given to like parts. The lower end of the trough portion 206' rests upon and is secured to platform segments 232 which are disposed above the elements 96 of the trough 95 (Figure 20). At this point, the trough 95 is disposed closer to the chain 87 than at the pick-up point of the bottom cracker 100, the platform segments 232 being located in respect to the posts 88 to permit the posts 88 to move the lowermost cracker 101 from the stack, as shown in Figure 20. The platform segments 232 include ramp portions 233 for easing the upper cracker 101 onto the charge of filling material 135 disposed on the bottom cracker 100.

The cracker release unit 44' adjacent the chute 42 is the same as the unit 44 adjacent the chute, and, hence, the same reference numerals primed have been employed to designate the several parts.

Similarly, the "no cracker" device 46' associated with and adjacent the chute 42 is like the device 46, and, hence, the same reference numerals primed have been employed to designate the several parts. The device 46' functions in the same manner as the device 46, the associated micro-switch 228' being connected in series with the power circuit of the motor 42, and/or in series with the power circuit of some warning device.

The sandwich presser device 47 is disposed in the path of travel of the completed sandwich 239 after it leaves the device 46' and includes a presser roller 240 freely rotatably mounted on a stub shaft 241 in the form of a bolt secured to the upper end of an adjustable bracket 242 by a suitable nut 243 (Figure 22 and 23). The adjustable bracket 242 is mounted on the plate 72 and is secured thereto by suitable bolts 244. Hence, the roller 240 is adjustable in respect to its clearance of the bottom of the trough 95 so that it is adapted to press the sandwiches 239 to the thickness desired. The roller 240 includes an annular channel 245 to receive the upper ends of the posts 88 as they pass along. For centering sandwiches 239 approaching the roller 240, there are provided opposed gate members 248 pivotally mounted on posts 249 supported by and secured to the plate 72, the free ends of the gate members 248 engaging the roller 240 when a small sandwich 239 or no sandwich is approaching the roller 240. Leaf springs 250 bias the gates 248 toward the roller 240, the leaf springs 250 being mounted on brackets 251 supported by and secured to the plate 72. It is manifest that the gates 248 replace segments of the side walls of the members 96 forming the trough 95.

As is clear from Figure 1 taken with Figure 22, the discharge trough 58 receives the sandwiches 239 as they leave the presser roller 240. The sandwich discharge end of the trough 58 is diagrammatically illustrated in Figure 29 in conjunction with preferred cracker sandwich stacking mechanism 60. The trough 58 terminates in an apron 260 having an opening 261 therein. An air jet 262 is disposed behind the apron 260 for discharge through the opening 261. Beneath the apron 260 is a continuous belt 263 driven from the motor 52 by a belt 264 and the necessary pulleys and gearing.

As the sandwiches 239 drop down the apron 260, the air jet 262 throws air against them to turn them into the position shown in Figure 29, and the continuous belt 263 conveys the stacked cracker sandwiches 239 to a waiting wrapping machine or the like.

It is noted that the motor 52 is connected to the speed chain unit 54 by an endless belt 270 and that the latter is connected to the gear reduction unit 56 by an endless belt 271. Suitable pulleys on the motor 52 and the units 54 and 56 receive the endless belts 270 and 271. The motor 52 and the units 54 and 56 are securely bolted to transversely disposed supporting members 273, 274 and 275, respectively, which are supported on the lower longitudinal frame members 74. A lever 277 extends through the plate 72 for changing the speed of the speed-change unit 54 (Figure 2). A starting switch 278 having "on" and "off" buttons 279 and 280, respectively, is provided and is conveniently located on the plate 72 as is shown in Figure 2.

*Operation*

It is manifest from the foregoing that, upon pressing the "on" button 279, the motor 52 will be energized to turn the shaft 105 to effect rotation of the sprocket 86 and the chain 87 and therethrough the sprocket 85. Since the plate 122 of the filler material receiving, mixing and discharging mechanism 48 is secured to the sprocket 85, the plate 122 and the connected parts including the sleeves 129 and nozzles 132 will rotate with it. Assuming that the two chutes 40 and 42 are full of crackers 100 and 101, respectively, movement of the chain 87 with its posts 88 beneath the chute 40 will cause each post 88, in turn, to move the bottom cracker 100 from the bottom of the stack. The crackers 100 will be pushed by the posts 88 along the trough 95 until they pass beneath the nozzles 132 of the mechanism 48, it being observed that the posts 88 and the nozzles 132 are the same distance apart center to center, so that, as each post 88 reaches the sprocket 85, its pushed bottom cracker 100 will be disposed directly beneath a nozzle 132, the nozzles 132 being a little ahead of the respective posts 88 so that filler material will be properly deposited upon the cracker 100 and not upon the post 88. It is manifest from Figure 12 that the posts 88, pushed crackers 100, and the nozzles 132 move in a fixed relationship for one hundred and eighty degrees of rotation of the plate 122. Hence, there is ample time for deposit of filler material on the crackers 100. As shown in the drawings, and considering Figures 7 through 12, the plate 122 is rotated counterclockwise so that filler material 135 in the groove 128 between tubes 129 is forced into the mouth 130 of each tube 129 by and as it approaches the stationary plunger 146, the amount of filler material 135 in the groove 128 for discharge being determined by the position of the plunger 161. Noting Figures 8 and 12, it is clear that the stationary plunger 146 is located just ahead of the cut-off wire 195, so that the filler material 135 is promptly severed from the nozzle 132 immediately upon extrusion thereof. Manifestly adjustments may be made in respect to location of the plate 141 which supports the plunger 146 through loosening and retightening the setscrew 143, and, if necessary, the cut-off wire 195 may be relocated upon the arcuate plate 184 if required. The crackers 100 receive filler material 135 from the nozzles 132 while in motion, and, after receiving the filler material 135 severed by the cut-off wire 195, pass on to successive positions beneath the chute 42 containing the top crackers 101. Considering Figures 20 and 21, each post 88 pushes the bottom cracker 100 from the stack in the chute 42, then slides it down the ramp portion 233 until it rests upon the filler material 135, thereby forming a loose sandwich 239. The trough 95 is, of course, at a greater distance below the tops of the posts 88 at the point beneath the chute 42 than beneath the chute 40 in order that the posts 88 may pick up and push the top crackers 101, there being an inclined portion in the trough 95 between the tangential point of the sprocket 85 and a point just forwardly of the chute 42, as is clear from Figure 1.

The loose sandwiches 239 are pushed between the gate members 248 which center them in respect to the roller 240. The sandwiches 239 are pushed beneath the roller 240 which is adjusted to the desired height for providing sandwiches 239 of desired thickness. The roller pressed sandwiches 239 are moved onto the discharge trough 58 and thence to the stacking mechanism 60 illustrated in Figure 29. The sandwiches 239 are blown over into the contacting positions as shown in Figure 29 which expedites packaging, since known packing or wrapping machinery will readily receive the sandwiches thus positioned.

The cracker release units 44 and 44′ permit a single bottom cracker at a time to be pushed out from beneath the respective stack by the posts 88 (Figures 5 and 20). The units 44 and 44′ are adjustable to allow for different thicknesses of crackers or the like from which the sandwiches are formed.

The "no cracker" devices 46 and 46′ stop the machine 35 upon failure of a post 88 to pick up either a bottom cracker 100 or a top cracker 101. Each unit 46 and 46′ is balanced so that the weight on the crackers 100 and 101 is not sufficient to damage even relatively fragile crackers. Upon failure of a bottom cracker 100 or a top cracker 101, the spaced runners 220 or 220′ respectively, drop into the space normally occupied by the respective cracker, thereupon actuating the respective micro-switch 228 or 228′ to open the circuit of the motor 52. As is mentioned above, this "no cracker" action of the devices 46 and 46′ may also set off an alarm electrically actuated, or, in the alternate, may set off an alarm so an operator will know that an incomplete sandwich will be ultimately discharged by the machine 35.

As stated above, filler material 135 is not discharged from a nozzle 132 when there is no cracker 100 beneath it. This "no cracker" device 50 is readily understood from the above description, particularly considering Figures 8–12, 17 and 18. The arcuate member 188 forming a portion of the trough 95 is moved inwardly under the action of the spring 189 acting through the lever 182 upon failure of a particular post 88 to pick up a cracker 100. Thereupon, the micro-switch 181 is actuated to effect energization of the solenoid 178 to withdraw the bracket 171 from beneath the nut 170 to permit the spring 168 to lower the plunger 161 into the groove 128, which thereupon plows the filler material 135 from the groove 128 so that there is no filler material 135 for the plunger 146 to force into the mouth 130 of the concerned tube 129. Manifestly, if there is a cracker 100 in the next space being pushed by the next post 88, the member 188 will be moved to its normal position against the force of the spring 189 by such cracker 100 and the micro-switch 181 will be released, whereupon the solenoid 178 will be deenergized and the bracket 171 will be moved beneath the nut 170 as the rod 162 is raised upon the plunger 161 riding upwardly over the top of the tube 129 immediately following the cleaned-out groove segment. The relationship of the member 188 and the plunger 161 is such that deenergization of the solenoid 178 occurs just as or just before the rod 162 is moved to its highest point in the travel of the plunger 161 over the upper end of the concerned tube 129.

The machine 35 will produce cracker sandwiches 239 or the like at a high rate of speed, four to six hundred peanut butter cracker sandwiches being formed per minute, although a lesser number may be formed if desired, the speed of the chain 87 being changeable through manipulation of the speed-change lever 77.

In Figures 25 through 28 is shown a modified form of mechanism for moving crackers or the like into positions for engagement by the pusher posts 88. The power train for this modification is illustrated in Figure 1. The same reference numerals are applied to parts which are identical with those heretofore described.

A bottom cracker chute 300 and a top cracker chute 301 are secured together by a member 302 and are closed at their lower ends by a plate 303 which is disposeed between the longitudinal reaches of the trough 95 and is suitably supported from the plate 72 (not shown). The chutes 300 and 301 have openings 306 and 307 at the bottom of each of a size and height to permit the bottom cracker to be pushed laterally therefrom onto the trough 95 and platform segments 232, respectively. Cracker release units 310 and 310′ are associated with the chutes 300 and 301, respectively, which are identical in construction, the latter being more particularly shown in detail in Figures 25 and 26, and including an L-shaped lever 311′ pivotally mounted on a pin 312′ supported at the free end of a bracket 313′ secured by suitable screws 314′ to the side of the chute 301. The free foot of the lever 311′ extends into an opening 315′ formed in the side of the chute 301 into position to permit discharge of the bottom top cracker 101, but to block discharge of the other crackers 101. A pin 316′ extending from the side of the lever 311′ and engaging in a slot 317′ formed in the bracket 313′ limits downward pivotal movement of the lever 311′.

Flat rams 320 and 320′ are provided for discharging the crackers 100 and 101, respectively. As is clear from Figures 27 and 28, the ram 320 includes a top plate 321 having side shoulders 322 closed by a bottom plate 323 to form, in effect, opposed grooves which engage the sides of a channel 324 formed in the plate 303. Suitable screws 325 secure the plates 321 and 323 together. A socket 326 is formed in the plates 321 and 323 which receives the ball head 327 of a member 328 telescopically received by a tube portion 329 of an oscillating arm 330. A compression spring 331 (not shown) urges the member 328 into engagement with the socket 326. The arm 330 is mounted intermediate its ends for oscillative movement on a screw 334 extending into the end of a post 33 (Figure 1) supported by a vertically disposed plate 335 in turn supported by opposed vertical frame members 73, being secured thereto by suitable screws 336. A roller 337 is rotatably mounted on the lower free end of the arm 330 by a suitable nut and bolt assembly 338. The ram 320' and the arm 330' are identical with the just described ram 320 and arm 330, primed reference numerals being employed to designate like parts. A heavy tension spring 340 biases the arms 330 and 330' about the pivot screws 334 and 334' to spread the rams 320 and 320', this biasing action being opposed by a cam 341, the collar 342 of which is secured to a driven shaft 343 by a suitable pin 344.

Referring to Figure 1, the driven shaft 343 is rotatably mounted in bearings 345 and 346 supported on transverse bracing frame members 347 which are suitably secured to vertical frame members 73. A bevelled pinion 348 is secured to one end of the driven shaft 343 by a suitable setscrew or the like and engages a bevelled gear 349 secured by a suitable pin 350 or the like to the shaft 105 for rotation therewith. At the other end of the shaft 343 is a balance wheel 351 secured thereto by a suitable setscrew 352 or the like.

The shaft 343 is driven in timed relation with the movement of the chain 87 and the posts 88 so that a bottom cracker 100 and a top cracker 101 are simultaneously discharged onto the trough 95 and the platform segments 232, respectively, ahead of each post 88. The spring 340 returns the arms 330 and 330' to the positions shown in Figure 5. Otherwise, the action of the modified machine 35 is the same as that described above.

It is manifest that there has been provided a sandwich making machine which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A sandwich making comprising, in combination, a bottom sandwich member receiving longitudinally split trough, a bottom sandwich member receiving chute disposed over said trough so that bottom sandwich members therein are stacked thereon, an endless pusher mechanism including spaced posts extending split through said trough and an endless chain supporting said posts adapted to successively move lowermost bottom sandwich members from said chute and to push them along said trough, filler material receiving and discharging mechanism including a rotatably mounted casing having peripherally arranged discharge nozzles disposed for a portion of their path of rotation over a portion of said trough and of said endless chain, and means for discharging filler material from said nozzles, a split trough segment disposed in aligned relation over said split trough and disposed at a point past said casing and its discharge nozzles, a top sandwich member receiving chute disposed over said trough segment and said trough said split trough segment receiving top sandwich members stacked in said last-mentioned chute in the path of said posts for successive pick-up of bottom top sandwich members by said posts, means for directing top sandwich members onto filler material carrying bottom sandwich members, means for pressing formed sandwiches to predetermined thickness, and means for discharging completed sandwiches from said pushing engagement by said posts.

2. A sandwich making machine comprising, in combination, a split trough for slidingly supporting sandwich members, means for dispensing sandwich members including a relatively short vertical chute portion disposed over said trough and employing the same as a bottom therefor, said means further including a relatively long chute portion disposed at an inclination to the horizontal and having its lower end in communication with the upper end of said relatively short chute portion, and movable conveyor means including spaced vertical posts extending upwardly through said split trough for removing sandwich members successively from said dispensing means and moving them along said trough.

3. In a sandwich making machine, in combination, a first slotted trough for slidingly supporting bottom sandwich members, means for dispensing bottom sandwich members including a chute disposed to one side of said first trough, a second slotted trough for slidingly supporting top sandwich members, said second trough being disposed directly above a portion of said first trough, means for dispensing top sandwich members including a chute disposed to one side of said second trough, power actuatable means for simultaneously displacing a bottom sandwich member from said first-mentioned chute onto said first trough and a top sandwich member from said second-mentioned chute onto said second trough, and movable means for moving successively displaced bottom sandwich members along said first trough to a position directly beneath respective successively displaced top sandwich members and for thereafter moving said vertically related bottom and top sandwich members along said first and second troughs, respectively, said latter means including a supported endless chain and spaced posts carried thereby, each of said posts being adapted to extend vertically through said first and second troughs to push first a bottom sandwich member only and subsequently both a bottom and a top sandwich member.

4. In a sandwich making machine, conveyor means for handling sandwich members, said means comprising a first and a second slotted trough, said second trough including a discharge end thereof being disposed directly above a portion of said first trough, an endless chain disposed at least in part directly beneath said first and second troughs, spaced posts carried by said chain and arranged to extend vertically through both of said troughs, each of said posts being thereby adapted to engage a bottom sandwich member disposed in said first trough and thereafter to push said bottom sandwich member continuously along said first trough while successively engaging a top sandwich member disposed in said second trough, pushing said top sandwich member continuously along said second trough to the discharge end thereof, discharging said top sandwich member from said second trough into said first trough so as to overlie said bottom sandwich member, and pushing said overlying top sandwich member together with said bottom sandwich member along said first trough, and power means for actuating said chain.

References Cited in the file of this patent

UNITED STATES PATENTS

| | | |
|---|---|---|
| 698,379 | Elizondo | Apr. 22, 1902 |
| 1,493,480 | DeTour | May 13, 1924 |
| 1,501,285 | Lawrence | July 15, 1924 |
| 1,791,399 | Den Boer | Feb. 3, 1931 |
| 1,904,742 | MacFarlane et al. | Apr. 18, 1933 |
| 1,943,444 | Knowlton | Jan. 16, 1934 |
| 1,969,994 | Stevenson | Jan. 16, 1934 |
| 2,348,400 | Manspeaker | May 9, 1944 |
| 2,349,579 | Litty | May 23, 1944 |
| 2,394,795 | Manspeaker | Feb. 12, 1946 |
| 2,472,650 | Curlee | June 7, 1949 |
| 2,542,200 | Kraeger | Feb. 20, 1951 |
| 2,603,341 | Knee | July 15, 1952 |